United States Patent [19]

Saib et al.

[11] Patent Number: 5,936,667
[45] Date of Patent: Aug. 10, 1999

[54] SYSTEM AND METHOD FOR TESTING AND UPDATING STORED CONTENT OF A REMOTE TRANSMITTER FOR AN ENTERTAINMENT SYSTEM

[75] Inventors: Joseph Saib; Atsushi Suzuki, both of San Diego, Calif.

[73] Assignees: Sony Corporation, Tokyo, Japan; Sony Electronics, Inc., Park Ridge, N.J.

[21] Appl. No.: 08/855,264

[22] Filed: May 13, 1997

[51] Int. Cl.$^6$ .................................................. H04N 17/00
[52] U.S. Cl. ............................ 348/180; 455/63; 348/734
[58] Field of Search .................................. 348/180, 734, 348/569, 8, 177, 189, 184; 455/3.1, 6.3; 386/83

[56] References Cited

U.S. PATENT DOCUMENTS

| | | | |
|---|---|---|---|
| 5,321,846 | 6/1994 | Yokota et al. | 455/6.3 |
| 5,574,905 | 11/1996 | Welmer | 455/6.3 |
| 5,592,213 | 1/1997 | Yoshinobu et al. | 348/734 |
| 5,657,414 | 8/1997 | Lett et al. | 348/734 |
| 5,689,081 | 11/1997 | Tsurumi | 455/6.3 |
| 5,722,041 | 2/1998 | Freadman | 455/6.3 |

*Primary Examiner*—Victor R. Kostak
*Attorney, Agent, or Firm*—Blakely, Sokoloff, Taylor & Zafman LLP

[57] ABSTRACT

A system and method for testing a system and method for testing a remote transmitter that controls a peripheral device and for updating control codes utilized by the remote transmitter. One embodiment of the system includes a peripheral device, a broadcast receiver such as an integrated receiver decoder (IRD) and a remote transmitter that receives signals from the IRD and generates control codes to the peripheral device to service a program event. The system supports automatic loading and updating of control codes used by the remote transmitter to control present and perhaps future peripheral devices. Likewise, the IRD supports testing of the remote transmitter through a testing screen.

15 Claims, 4 Drawing Sheets

SYSTEM AND METHOD FOR TESTING AND UPDATING STORED CONTENT OF A REMOTE TRANSMITTER FOR AN ENTERTAINMENT SYSTEM

BACKGROUND OF THE INVENTION

1. Field of the Invention

The present invention relates to the field of information systems. More particularly, the present invention relates to a system and method for automatically updating control codes pre-stored within a broadcast receiver and testing its remote transmitter.

2. Description of Art Related to the Invention

Over the last few years, there has been a growing demand for entertainment systems working in conjunction with various types of broadcasting systems. An example of an entertainment system includes a digital satellite system (DSS). The DSS includes an antenna that receives a digital bit stream from DSS satellites and routes the bit stream to an integrated receiver decoder (IRD). The IRD is responsible for decoding the bit stream and processing the decoded bit stream to produce an output signal having an appropriate format. The output signal is sent to one or more peripheral devices. The peripheral device(s) may include one or more analog-input peripheral devices such as a television receiver or an analog video cassette recorder (VCR). The IRD can be user controlled through a remote control.

For current DSS architectures, the operations of the analog VCR are controlled by a remote transmitter. The remote transmitter is connected to an output port of the IRD (e.g., a serial port) through a unidirectional coaxial cable and is manually programmed by the user to store one or more control codes associated with a certain model and type of peripheral device. Hence, upon receiving a control signal from the IRD requesting the analog VCR to perform a particular operational command, the remote transmitter outputs a control code recognized by the analog VCR. If infrared (IR) transmissions are used between the remote transmitter and the analog VCR, the control code is a sequence of non-visible, light pulses which are interpreted by the analog VCR as an operational command. Examples of operational commands include "power-on", "record", "stop record", and "power-off".

Based on the current DSS architecture described above, a number of disadvantages have been realized. One disadvantage is that the user is required to manually program the remote transmitter by entering an index number assigned to the peripheral device. Each index number is assigned a number of control codes associated with each operational command to be performed by the analog VCR. This scheme unnecessarily increases the possibility of user error, causing the ISD to not function properly and to miss recording a program event (e.g., television program, pay-per-view movie, etc.).

Another disadvantage involves potential incompatibility between the remote transmitter and future peripheral devices (e.g., analog VCRs) controlled by IRD. Currently, the remote transmitter is only programmed at manufacture with control codes for a limited number of analog VCRs. Hence, it would be necessary to purchase a new remote transmitter upon upgrading a PSS with a future peripheral device. In view of the foregoing, it would be beneficial to develop a system that allows the remote transmitter to be periodically updated with control codes associated with future peripheral devices. This would enable communications to exist between the IRD and future peripheral devices implemented in the DSS.

Yet another disadvantage associated with the above-identified DDS architecture is that it does not provide a dedicated testing mechanism to allow the user to verify that the remote transmitter and its entertainment system are functioning properly. Currently, the remote transmitter is tested by programming the IRD to record, during a predetermined time interval, a program event on recording medium such as a video cassette tape. Thereafter, the user analyzes the recording medium to determine whether the program event has been recorded accurately. This testing technique is time-consuming to the user and complicates diagnostics if recording errors are detected. Hence, it would be beneficial to develop a dedicated testing mechanism to reduce testing complexity.

SUMMARY OF THE INVENTION

The present invention relates to an entertainment system and method for testing a remote transmitter that controls a peripheral device and for updating control codes utilized by the remote transmitter. One embodiment of the entertainment system includes a peripheral device, a broadcast receiver (e.g., an integrated receiver decoder "IRD") and a remote transmitter that receives signals from the IRD and generates control codes to the peripheral device to support viewing and/or recording of a program event. The entertainment system supports automatic loading and updating of control codes used by the remote transmitter to control currently produced peripheral devices and perhaps peripheral devices produced in the future. Likewise, the IRD supports testing of the remote transmitter through a testing screen.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates a system and method for updating control codes necessary to establish and maintain communications with a peripheral device of the system and for testing a remote transmitter. Of course, the invention may be used in other applications using broadcast receivers such as an integrated receiver decoder (IRD), a cable box for a Cable Broadcasting System, an Internet terminal, and the like.

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is defined as one or more bits of information transmitted either in a parallel or in a serial manner. A "control code" is a predetermined bit pattern which, upon transmission, is interpreted by the peripheral device as an operational command. The control code may be transmitted as a predetermined number and sequence of digital bits, a plurality of analog signals, a predetermined number and sequence of non-visible, light pulses, and the like. Moreover, certain illustrative embodiments are described in order to convey the spirit and scope of the present invention. While these embodiments are set forth to describe the invention, such embodiments should not be construed as a limitation on the scope of the present invention.

Figure 1:
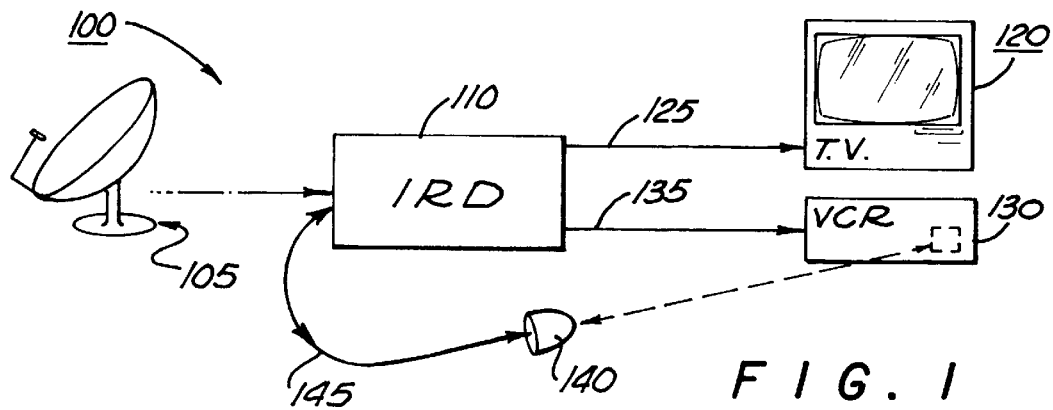
FIG. 1 is an illustrative embodiment of an entertainment system utilizing a remote transmitter to control operations of an analog input peripheral device.

Referring to FIG. 1, a first embodiment of an entertainment system utilizing the present invention is shown. The entertainment system 100 comprises an antenna 105, a broadcast receiver 110 such as an integrated receiver decoder (IRD) for example, and one or more peripheral devices. The broadcast receiver, in general, receive a broadcast signal (e.g., a digital bit stream) and performs operations on the broadcast signal to produce digital and/or analog information. However, for this embodiment, IRD is implemented as the broadcast receiver.

The peripheral device(s) may include, but is not limited or restricted to, (i) a digital-input peripheral device 120 such as a digital television "TV", a digital video cassette recorder "VCR", a digital video disk player, and the like, and/or (ii) an analog-input peripheral device 130 (e.g., an analog TV, and/or an analog VCR). At least one peripheral device is controlled by a remote transmitter 140 of the system 100.

The antenna 105 receives the digital bit stream from an orbiting satellite (not shown). Typically, the bit stream is formatted in accordance with any video compression function and encrypted under either a symmetric key cryptographic function or a public-key cryptographic function. In accordance with a selected data structure, the bit stream includes, but is not limited or restricted to video, audio, and control information such as programming data (e.g., title, date, channel, start-time, end-time, etc.). For example, it is contemplated that audio-only programming does not require the bit stream to include video.

As shown in this embodiment, antenna 105 transfers the bit stream to IRD 110. IRD 110 may process the bit stream into digital data (e.g., video and audio) having a format recognized by digital TV 120. The digital data is transferred to digital TV 120 through a unidirectional communication line 125. Alternatively, independently, or perhaps in addition to the production of digital data, IRD 110 processes the bit stream into data having an analog format (e.g., video and audio) and outputs the data to an analog VCR 130 via unidirectional communication line 135. The analog format may be in accordance with a video format established by National Television Systems Committee (NTSC), or perhaps other video formats, including but is not limited to Phase Alternating Line (PAL), Sequential Couleur avec Memoire (SECAM) and other recognized formats. IRD 110 further controls the operations of analog VCR 130 via the remote transmitter 140 as shown.

The remote transmitter 140 is coupled to at least one input/output (I/O) port of IRD 110 through a communication line 145. More particularly, communication line 145 supports communications between IRD 110 and remote transmitter 140 so that IRD 110 can indirectly control various operations by analog VCR 130. Although not shown, remote transmitter 140 includes internal memory and processing circuitry (e.g., a micro-controller, processor or any combination of logic circuitry) to translate signals from IRD 110 into corresponding control codes recognized by analog VCR 130. Unlike conventional DSS architectures, communications between the remote transmitter 140 and a peripheral device (e.g., analog VCR 130 for this embodiment) are bidirectional. This allows the remote transmitter 140 to query analog VCR 130 to obtain a selected control code used to communicate with analog VCR 130. It is contemplated, however, that another type of peripheral device may be substituted for the analog VCR 130 to enable IRD 110 to control that type of peripheral device.

Figure 2:
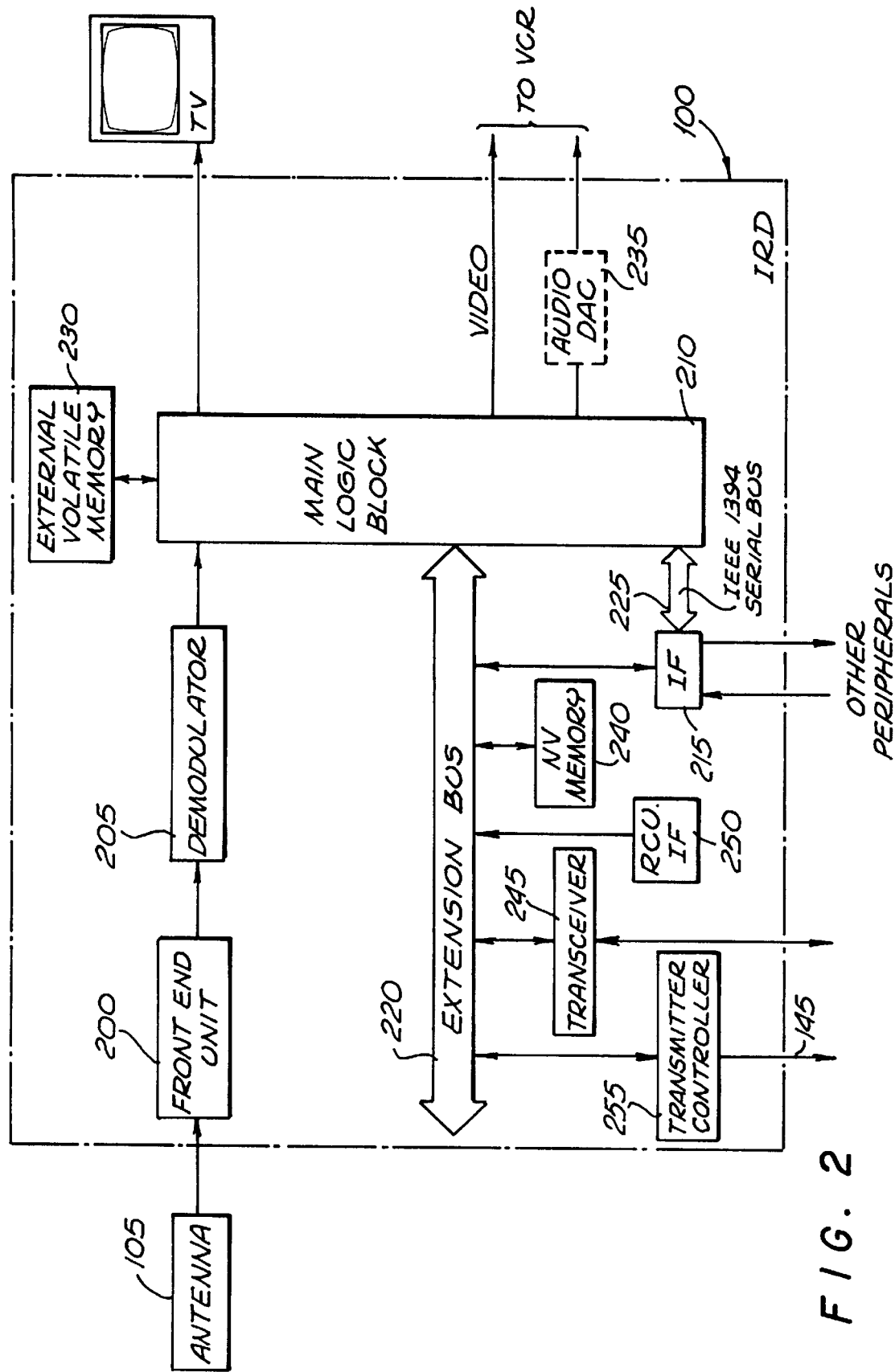
FIG. 2 is a more detailed block diagram featuring one embodiment of an integrated receiver decoder implemented within the entertainment system of FIG. 1.

Generally concurrent to processing the bit stream to place the video and/or audio into an appropriate format, IRD 110 further signals a transmitter controller, situated within IRD 110 as shown in FIG. 2, to cause remote transmitter 140 to transmit a query to analog VCR 130. A "query" is one or more signals that prompt analog VCR 130 to identify itself. The chosen identification scheme is a design choice. For example, analog VCR 130 could respond to the query through transmission of an index number, if a table of indices corresponding to each peripheral device supported by IRD 110 and their associated control codes are loaded in either non-volatile memory of IRD 110 or internal memory of a remote transmitter 140. The index number is representative of the type of analog VCR implemented within the entertainment system. For example, when indices and control codes are loaded in IRD 110 and upon receiving the index number from remote transmitter 140, IRD 110 automatically loads control codes associated with the index number into remote transmitter 140. Alternatively, in lieu of indices, analog VCR 130 could respond to the query by transmitting signals identifying analog VCR 130 by its alphanumeric name or model number. This alphanumeric information would be recognized by IRD 110 to automatically load appropriate control codes contained in IRD 110 into remote transmitter 140.

Another example of the identification scheme involves direct transmission of certain control codes used by the remote transmitter 140 in order to power-up, start record, stop record, or power-down a peripheral device. This technique would allow control codes associated with future peripheral devices to be supported without replacing remote transmitter 140.

Referring now to FIG. 2, an illustrative embodiment of IRD 110 is shown. Antenna 105 transfers the bit stream to a front-end unit 200 of IRD 110. Although not shown, front-end unit 200 includes (i) amplification circuitry used to amplify any relatively weak signals received at antenna 105 and (ii) a tuner which allows a user to "tune" to a desired frequency channel.

For the case where the user wishes to watch a show broadcast by the digital satellite system service provider, the bit stream associated with the show is routed from front-end unit 200 to a demodulator 205. In demodulator 205, the bit stream is initially processed before transferring to a main logic block 210 for further processing. Such initial processing may include exposing the bit stream to demodulation and decoding functions such as QPSK-demodulation, viterbi-decoding, de-interleaving and Reed-Solomon decoding.

Figure 4:
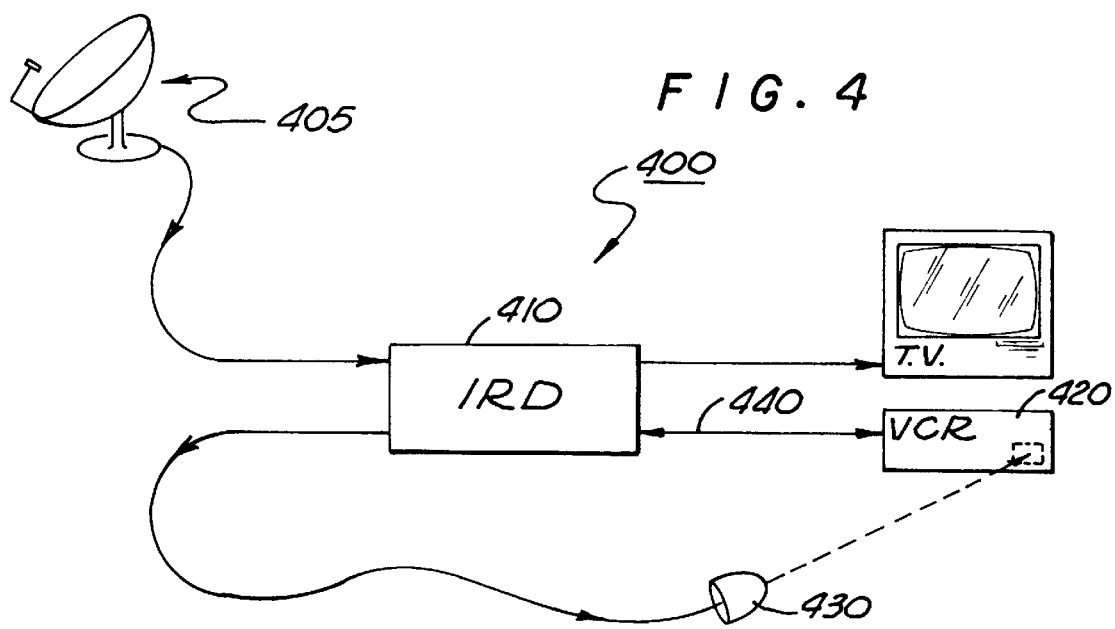
FIG. 4 is a second illustrative embodiment of the entertainment system of FIG. 1.

In some cases, IRD 110 is connected to other peripheral devices though an interface (IF) 215. In this embodiment, IF 215 may include a link layer integrated circuit (IC) and a physical layer IC (not shown) which may comply with the IEEE standards document 1394 entitled "Standard for High Performance Serial Bus" (hereinafter referred to as "IEEE 1394"). This would enables IRD 110 to interact with digital-input peripheral devices as shown in FIG. 4 through IF 215 and either extension bus 220 or IEEE 1394 serial bus 225.

Figure 3:
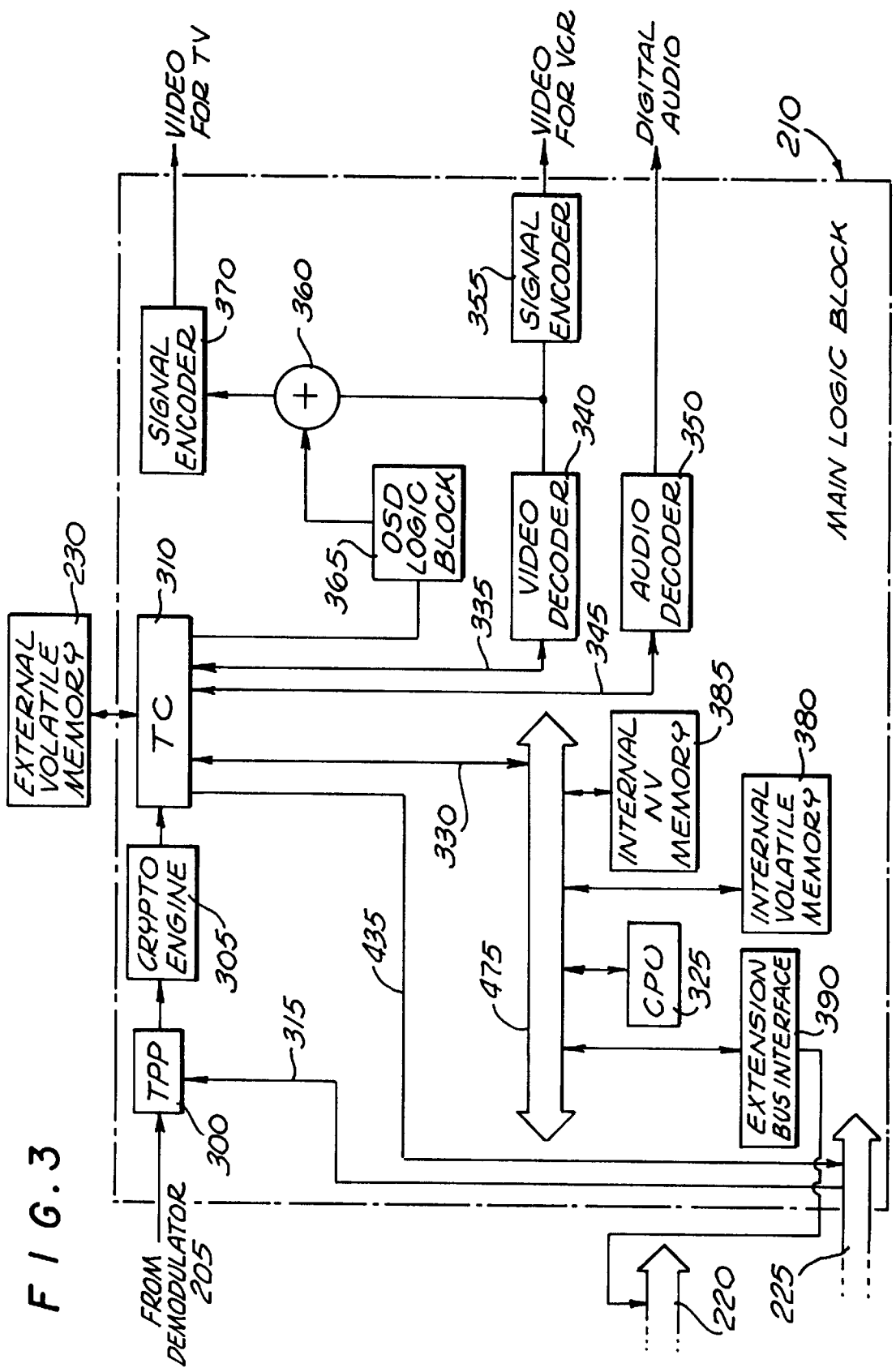
FIG. 3 is a more detailed block diagram featuring one embodiment of a main logic block of the integrated receiver decoder of FIG. 2.

Referring now to FIG. 3, the electronic circuitry of the main logic block 210 is shown. The Transport Packet Parser (TPP) 300 receives the decoded bit stream and performs a parsing operation thereon in order to separate information having different characteristics (video, audio, control) from the bit stream. Then, the parsed bit stream is decrypted by a cryptographic engine 305 which may operate in accordance with a cryptographic function, for example Data Encryption Standard (DES). However, if the bit stream is received from IF 215 routed through communication line 315, cryptographic engine 305 will be precluded from decrypting the bit stream since it is already in a decrypted form. Thereafter, the decrypted bit stream is stored in an external volatile memory 230 (e.g., random access memory "RAM") under the control of traffic controller (TC) 310.

In response to a control signal from CPU 325 via communication line 330, traffic controller 310 retrieves at least portions of the stored decrypted bit stream from external volatile memory 230. Thereafter, traffic controller 310 distributes particular portions of the decrypted bit stream to either a video decoder 340 or an audio decoder 350 via communication lines 335 and 345, respectively. These decoders perform decompression operations in accordance with Moving Picture Experts Group (MPEG), Joint Picture Experts Group (JPEG) or any other video decompression function.

In order to output an analog signal to an analog VCR (if desired), video output from video decoder 340 is transferred to a signal encoder 355. Upon receipt, the signal encoder 355 converts the video output into an analog signal having a recognized video format such as NTSC, PAL, SECAM and the like. This analog signal is transferred to analog VCR for recordation on a recording medium (e.g., video cassette tape).

Similarly, to output a digital signal to the digital TV, the video output from video decoder 340 is mixed in mixer 360 after on-screen display (OSD) data (e.g., a programming table), present in the bit stream, is decoded by OSD logic block 365. OSD logic block 365 performs decompression in accordance with a recognized video format. Mixer 360 produces a mixed video output that is transferred to another signal encoder 370. Signal encoder 370 converts the mixed video output into a digital signal having a recognized video format for use by the digital TV.

Generally concurrent to these operations, as shown in both FIGS. 2-3, the audio output in a digital format is transmitted from audio decoder 350 to digital TV 120. The analog signal may be transferred to analog VCR to be recorded on recording medium in combination with corresponding analog signals associated with video from signal encoder 355.

Optionally, if IRD 110 is configured to support an analog TV, audio decoder 350 would be configured to transfer its audio output to an audio digital-to-analog converter (DAC) 235 placed within IRD 110, as identified by dashed lines. The audio DAC 235, if implemented, would convert digital audio output into an analog signal. Likewise, signal encoder 370 would be replaced with an encoder that converts digital video into an analog format recognized by the analog TV.

Referring to FIG. 3, CPU 325 controls all of the above mentioned processes. To control the above-mentioned processes, CPU 325 communicates with a plurality of elements through an internal high-speed bus 375. These elements may include, but are not limited or restricted to an optional internal volatile memory 380, at least one internal non-volatile memory element 385 (e.g., read only memory "ROM", erasable programmable read only memory "EPROM", electrically erasable programmable read only memory "EEPROM" and/or flash memory), and an extension bus interface 390.

Returning back to FIG. 2, CPU 325 communicates with an external non-volatile memory element 240 (e.g., read only memory "ROM", flash memory, etc.) which is capable of containing at least software used to prompt the remote transmitter (not shown) to generate a query. Such prompting may involve transmission of a control signal to the remote transmitter in response to selection of a set-up screen of the IRD, a power-up condition, and the like. CPU 325 also communicates with transceiver device 245 (e.g., a modem), a remote command unit interface (RCU-IF) 250 and a transmitter controller 255. Communications with transmitter controller 255 are maintained through extension bus interface 390 and extension bus 220 as shown in FIGS. 2-3. The RCU-IF 250 receives commands from a remote control (not shown) and transfers these commands to CPU 325 via extension bus 220. The remote control may include one described in U.S. Pat. No. 5,453,758 assigned to Sony Corporation of Tokyo, Japan, as well as any other types of remote control.

Referring to FIGS. 1-2, transmitter controller 255 includes an Application Specific Integrated Circuit (ASIC) to perform a number of operations. One operation involves transmission of signals to the remote transmitter via communication line 145 to prompt the remote transmitter to transmit a control code to a peripheral device (e.g., analog VCR). Examples of the remote transmitter 140 may include, but are not limited or restricted to, an infrared transmitter such as those manufactured by Matsushita of Osaka, Japan and commercially available from Sony Corporation of Tokyo, Japan (referred to as VCR MOUSE™).

Referring now to FIG. 4, a second embodiment of an entertainment system utilizing the present invention is shown. Similar to the embodiment illustrated in FIG. 1, the entertainment system 400 comprises an antenna 405, an IRD 410, peripheral device 420 and a remote transmitter 430. For this embodiment, the peripheral device includes an analog VCR. Instead of using remote transmitter 430 to identify the type of analog VCR 420 through a query-response scheme, a bi-directional communication line 440 is directly connected between IRD 410 and analog VCR 420. In its preferred embodiment, the bi-directional communication line 440 complies with IEEE standards document 1394 entitled "Standard for High Performance Serial Bus" (hereinafter referred to as "IEEE 1394"), although other bi-directional communications may be implemented besides those relying on IEEE 1394.

More particularly, as shown in FIGS. 2-3, CPU 325 produces the query and routes the query to IF 215 via extension bus 220 and extension bus interface 390. Thereafter, IF 215 routes the query to the analog VCR and awaits a response to the query. The response is either routed to CPU 325 for processing or directly routed to the transmitter controller 255. For both routing paths, IRD 410 is signaling the remote transmitter as to the type of analog VCR connected to the system 400. IRD 410 is responsible for automatically downloading pre-stored control codes into the remote transmitter 430. These pre-stored control codes are loaded in IRD 410 and are now automatically loaded within the analog VCR.

Figure 5:
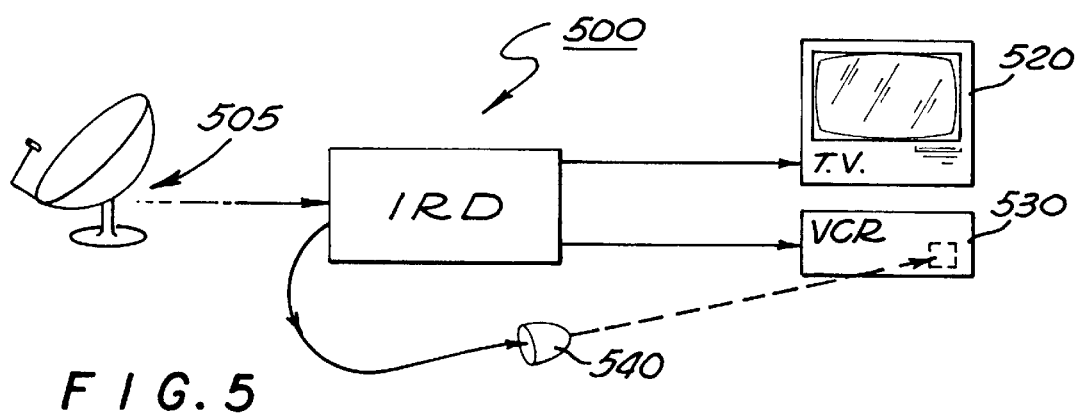
FIG. 5 is a third illustrative embodiment of the entertainment system of FIG. 1.

Referring to FIG. 5, a third embodiment of an entertainment system utilizing the present invention is shown. The entertainment system 500 comprises an antenna 505, an IRD 510, a television receiver (TV) 520, an analog VCR 530 and a remote transmitter 540. The architecture of this entertainment system 500 is similar to the conventional DSS. However, software is loaded within non-volatile memory of IRD 510 (e.g., the external non-volatile memory 240 of FIG. 2), which when executed, causes generation of a VCR mouse set-up screen as shown in FIG. 6.

Figure 6:
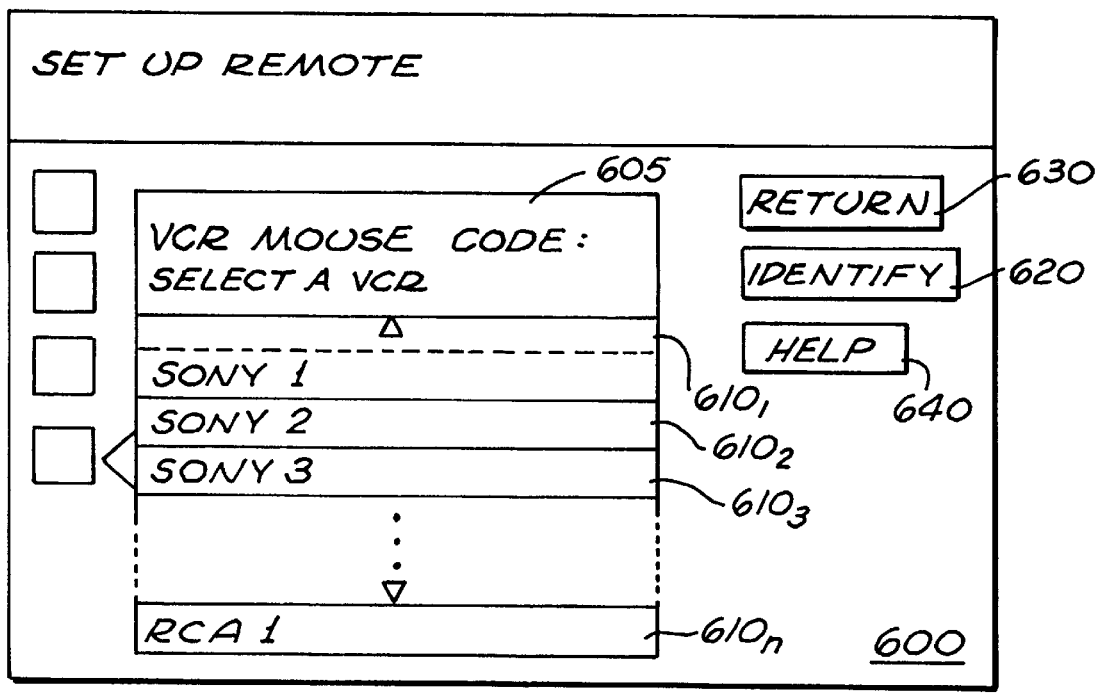
FIG. 6 is a set-up screen display for configuring the type of analog VCR incorporated with the entertainment system.

Referring now to FIG. 6, the VCR mouse set-up screen 600 includes a header 605 and a plurality of option grids $610_1$–$610_n$ ("n" is a positive whole number). The header 605 identifies the purpose of the screen. Using the remote control, the user scrolls through a list all peripheral devices supported by the remote transmitter. Upon locating an option grid listing the analog VCR of the DSS, the user selects that option grid (e.g., option grid $610_2$) and depresses a button on the remote control to select a grid (e.g., "identify" grid 620) of setup screen 600. This causes control codes associated with the analog VCR to be output to the remote transmitter through the transmitter controller. Other grids include "Return" and "Help" grids 630 and 640 to return the user to an electronic guide screen without modifying the selection or to provide an explanation of control code loading within the menu screen.

Figure 7:
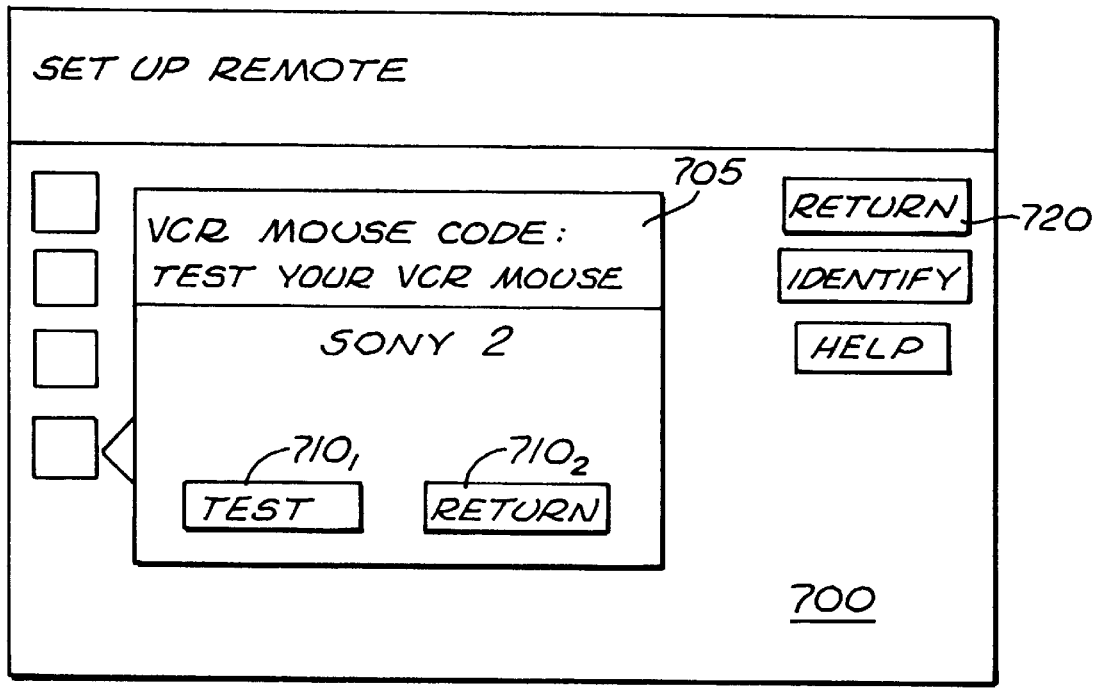
FIG. 7 is a testing screen for initiating a test to determine whether the remote transmitter is functioning properly.

Referring now to FIG. 7, besides providing capability to the remote transmitter, the entertainment system is further capable of undergoing a testing procedure. Upon depressing a selected button of the remote control, a VCR MOUSE™ test screen is displayed on the TV. The VCR MOUSE™ test screen 700 includes a header 705 and a plurality of option grids $710_1$–$710_2$. The first option grid $710_1$ includes a virtual "test" keypad, which when selected and activated to perform a test, requires the CPU to execute a test application associated with the VCR MOUSE™. The test application causes the remote transmitter to perform operational commands on its peripheral device. The success or failure of these operational commands are noted as test results and returned to the CPU of the IRD. The results may be prepared as a screen display for readout by the user. The second option grid $710_2$, when selected, returns the user to the electronic guide screen.

The present invention described herein may be designed in many different embodiments and using many different configurations. As discussed herein, the architecture of the IRD is flexible, provided it includes appropriate port(s) to transmit signals to the remote transmitter to control the peripheral device. While the present invention has been described in terms of various embodiments, other embodiments may come to mind to those skilled in the art without departing from the spirit and scope of the present invention. The invention should, therefore, be measured in terms of the claims which follow.

What is claimed is:

1. An entertainment system comprising:
   a broadcast receiver;
   a remote transmitter coupled to the broadcast receiver, the remote transmitter to generate a query; and
   a peripheral device in communications with both the remote transmitter and the broadcast receiver, the peripheral device providing information to the remote transmitter in response to the query, the information being routed to the broadcast receiver to test whether the remote transmitter is operating properly.

2. The entertainment system of claim 1, wherein the broadcast receiver includes an integrated receiver decoder.

3. The entertainment system of claim 2, wherein the peripheral device including an analog-input peripheral device being controlled by the remote transmitter.

4. The entertainment system of claim 2, wherein the peripheral device including a digital-input peripheral device being controlled by the remote transmitter.

5. The entertainment system of claim 1, wherein the remote transmitter further controls the operations of the peripheral device by transmitting a control code to the peripheral device.

6. The entertainment system of claim 5, wherein the control code is a bit pattern representing one of a plurality of operational commands including power-on, record, stop record and power-off.

7. The entertainment system of claim 1, wherein the control information includes an index number identifying at least a type of the peripheral device, the index number is provided to and processed by the broadcast receiver to load a plurality of control codes associated with the index number into the remote transmitter.

8. The entertainment system of claim 1, wherein the information includes a plurality of control codes loaded into the remote transmitter.

9. An entertainment system comprising:
   a broadcast receiver;
   a communication line coupled to the broadcast receiver;
   a peripheral device coupled to the communication line, the peripheral device transferring control information through the communication line to the broadcast receiver in response to a query by the broadcast receiver; and
   a remote transmitter coupled to the broadcast receiver, the remote transmitter routing the control information to the broadcast receiver in order to test functionality of the remote transmitter.

10. The entertainment system of claim 9, wherein the control information further indicates a manufacture type of the peripheral device to allow the broadcast receiver to provide a plurality of control codes dedicated to the manufacture type of the peripheral device to control operations thereof.

11. The entertainment system of claim 10, wherein the communication line is a high performance serial bus supporting bi-directional communications between the integrated receiver decoder and the peripheral device.

12. The entertainment system of claim 11, wherein the peripheral device is one of a digital television receiver and a digital video recorder.

13. The entertainment system of claim 12, wherein the remote transmitter includes a processing unit and an internal memory to contain the plurality of control codes.

14. A method for testing a remote transmitter coupled to a broadcast receiver and used to control operations of a peripheral device, the method comprising:
   generating a test screen by the broadcast receiver;
   performing a plurality of operational commands on the remote transmitter upon selecting a start option grid of the test screen;
   creating test results to determine whether the remote transmitter successfully performs each of the plurality of operational commands; and
   returning the test results to the broadcast receiver.

15. The method of claim 14 further comprising formatting the test results by the broadcast receiver for display.

* * * * *